Oct. 27, 1970    H. U. KORTE    3,535,787
DENTURE SUPPORT
Filed June 27, 1968
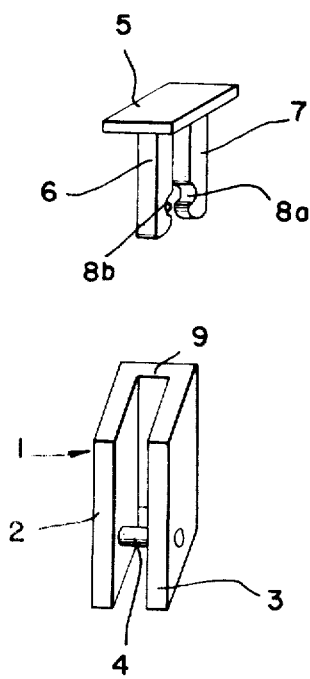
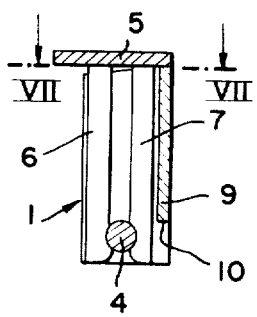
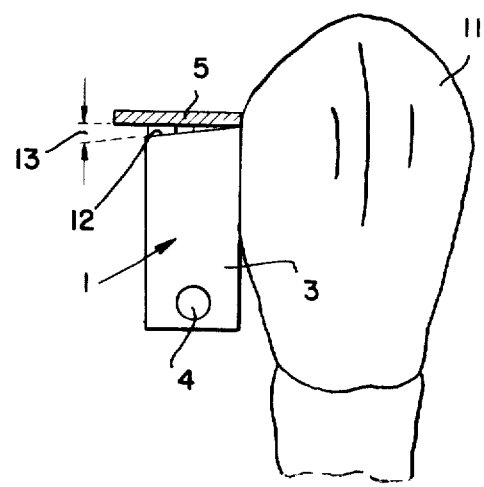
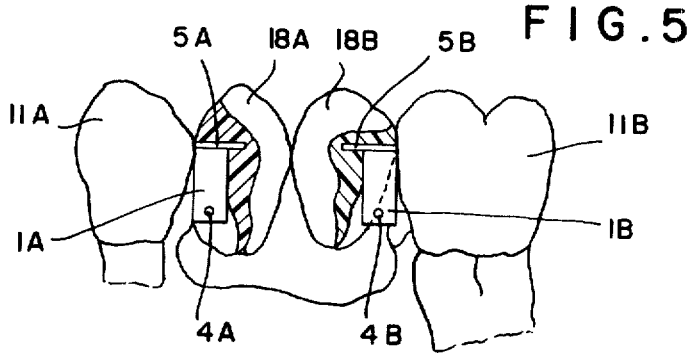
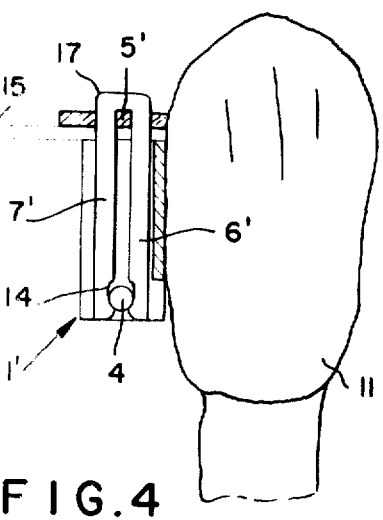
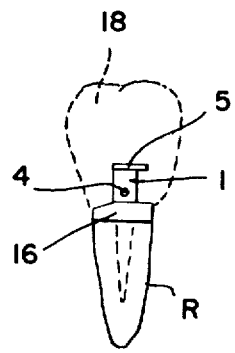
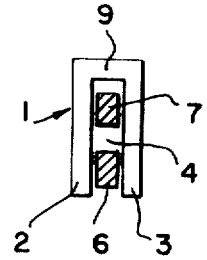
INVENTOR,
HANS ULRICH KORTE
BY Karl J. Ross
ATTORNEY

United States Patent Office 3,535,787
Patented Oct. 27, 1970

3,535,787
DENTURE SUPPORT
Hans Ulrich Korte, Nibelungenstr. 9,
Marl-Huls, Germany
Filed June 27, 1968, Ser. No. 754,751
Int. Cl. A61c 13/22
U.S. Cl. 32—5                                8 Claims

ABSTRACT OF THE DISCLOSURE

For supporting a partial denture, a socket with a generally vertical channel is cemented or otherwise attached to an adjoining crown or to the cap of a root-canal pin, the channel being traversed near its bottom by a pin engageable by a pair of spring legs depending from a carrier plate which overlies the socket upon assembly.

---

My present invention relates to a support for a partial denture.

Partial dentures are usually provided with clamps by which they may be anchored to an adjoining natural tooth. Other mounting means currently available include flexible links adapted to be screwed or otherwise attached to the crown of a tooth. These prosthetic devices suffer from a variety of drawbacks including structural complexity, mechanical strain upon heretofore healthy teeth and/or the tendency of accumulating decaying food particles.

The general object of my present invention is to provide a denture support which avoids the above drawbacks.

A more particular object is to provide simple means for removably anchoring one or more artificial teeth to an adjoining tooth, or to the head of a root-canal pin, in a manner enabling ready removal and reinsertion of the denture by the wearer.

It is also an object of my present invention to provide a dental appliance of this type which, while securely anchoring a partial denture to a natural tooth or root, allows the denture to come to rest directly on the gums, thereby reducing the stress upon the tooth or tooth fragment to which it is attached.

These objects are realized, pursuant to my present invention, by the provision of a socket member formed with a generally vertical channel which is spanned by a transverse pin preferably disposed near the bottom of the channel, the pin being embraced by confronting recesses in a pair of spring legs depending from a preferably plate-shaped carrier element which overlies the socket member. This carrier element, in turn, may be wholly or partly embedded in a dental prosthesis cast around it.

The spring legs, which advantageously fit with little lateral clearance inside the channel so as to be positively guided therein, are cammed apart by the pin in response to a strong upward pull to release the partial denture from its support. The channel of the socket member, which is then open on three sides, is readily accessible to a toothbrush for removal of any accumulated food particles. The tendency for such accumulation, however, is very slight since in use the channel is almost completely occupied by the spring legs and is virtually inaccessible from the top in view of the overlying and, preferably, somewhat overhanging carrier plate.

Relative terms such as "top" and "bottom," as used hereinabove and in the appended claims, refer only to a certain position of the denture which corresponds to its aplication to the lower jaw; when the denture is to be affixed to the upper jaw, these terms will have to be reversed as will be readily understood.

The socket member of my improved denture support may be cemented or otherwise permanently attached to the crown of an adjoining tooth or to the head of a root-canal pin inserted in an underlying tooth fragment. Sufficient play may be provided between the carrier plate and the socket member to allow the denture to tilt slightly, in the absence of an anchor at the opposite end, so as to come to rest on the underlying gum; for this purpose it may be convenient to bevel the upper surface of the socket member and, where this member is generally U-shaped in horizontal cross-section, to foreshorten the web part of the socket defining the bight of the U in order to allow for a canting of the spring legs. For the same purpose it may be desirable to extend the recesses of these spring legs slightly above and/or below the associated pin so as to facilitate relative vertical motion without disengagement.

Both these measures afford a limited mobility to the carrier element, relatively to the socket member, in a vertical plane perpendicular to the pin.

The above and other features of my invention will become more fully apparent from the following detailed description of certain embodiments, reference being made to the accompanying drawing in which:

FIG. 1A is a perspective view of a socket member forming part of a denture support according to my invention;

FIG. 1B is a perspective view of an insert designed to fit in the socket member of FIG. 1A;

FIG. 2 is a cross-sectional view of the assembled support in a vertical plane of symmetry;

FIG. 3 is a side-elevational view, partly in section, of the same support shown attached to the crown of a natural tooth;

FIG. 4 is a view similar to FIG. 3, showing a slightly modified denture support according to the invention;

FIG. 5 is a side-elevational view, partly in section, of a denture provided with two supports according to my invention which are anchored to a pair of natural teeth at opposite ends of the denture;

FIG. 6 is an elevational view of a denture support according to the invention anchored to a root-canal pin; and FIG. 7 is a cross-sectional view taken on the line VII—VII of FIG. 2.

In FIGS. 1–3 and 7 I have shown a denture support comprising a socket member, generally designated 1, which has a vertical channel defined by a pair of flanges 2, 3 and a web 9; the horizontal cross-section of this member is, thus, generally U-shaped. The arms of the U, i.e. the flanges 2 and 3, are spanned by a transverse pin 4 located in the bottom quarter of the height of the channel.

A carrier plate 5, of rectangular shape, is provided with a pair of depending legs 6, 7 which are formed with confronting recesses 8a and 8b near their free ends; the legs 6 and 7 are insertable, with close lateral fit (as best seen in FIG. 7), into the channel of member 1 and are resiliently spreadable to embrace the pin 4 in a fully inserted position as shown in FIG. 2. The upper edges 12 of flanges 2 and 3 are beveled so as to slope downwardly in a direction away from web 9, thus allowing the plate 5 to tilt within an angular range 13 as indicated in FIG. 3. The lower end of web 9 is cut away at 10, just above the level of pin 4, to let the insert 5–7 swing about the pin to the extent permitted by the bevel 12 whereby a cantilevered denture attached to plate 5 can come to rest on the gums to the left of a tooth 11 (FIG. 3). Plate 5 has an overhanging edge, remote from web 9, to which the denture can be permanently attached.

As shown in FIG. 3, insert 1 is cemented or soldered to the dentine or to a metallic crown of the adjoining natural tooth 11. Plate 5 is embedded in an artificial tooth molded therearound, this having been illustrated in FIG. 5 which shows two natural anchor teeth 11A, 11B and two artificial teeth 18A, 18B cast around plates 5A, 5B of my improved denture support whose sockets 1A, 1B and pins 4A, 4B are aslo visible.

In FIG. 4 I have shown a modified version of this denture support in which the socket member 1' is formed with substantially horizontally upper edges but the legs 6', 7' of the insert have elongate cutouts 14 affording a certain vertical play 15 between these legs and the crosspin 4. This figure also illustrates the possibility of making the legs 6', 8' integral with each other as part of a generally U-shaped clip inserted from above into apertures of carrier plate 5'.

FIG. 6 illustrates the possibility of fastening the socket 1, by soldering, cementing or otherwise, to the head 16 of a root-canal pin inserted into the root R of a natural tooth. An artificial tooth 18 may again be cast around the plate 4, as illustrated in dot-dash lines, for removable attachment to the root R.

Although the drawing illustrates the use of my improved denture support only for the lower jaw, it will be apparent that the same appliance will serve in inverted position to mount one or more artificial teeth, or tooth portions as in FIG. 6, on the upper jaw. These and other modifications are intended to be embraced within the spirit and scope of my invention as defined in the appended claims.

I claim:

1. A support for a partial denture, comprising a socket member of generally U-shaped horizontal cross-section with a pair of flanges defining between them a generally vertical channel, a substantially vertical web interconnecting said flanges, and a transverse pin on said flanges spanning said channel; a carrier element overlying said socket member with limited relative mobility in a vertical plane perpendicular to said pin; and a pair of spring legs depending from said element into said channel, said legs being formed with confronting recesses embracing said pin.

2. A support as defined in claim 1 wherein said pin is located near the bottom of said channel, said web being foreshortened above the level of said pin.

3. A support as defined in claim 2 wherein said flanges have upper edges sloping downwardly in a direction away from said web to facilitate tilting of said carrier element about said pin.

4. A support as defined in claim 1 wherein said carrier element is a plate having an edge flush with said web and an opposite edge projecting beyond said flanges.

5. A support as defined in claim 1 wherein said recesses engage said pin with substantial vertical play.

6. A support as defined in claim 1 wherein said legs are received in said channel with small lateral clearance.

7. A support as defined in claim 1 wherein said carrier element is a plate provided with a pair of apertures, said legs being part of a generally U-shaped clip inserted into said apertures.

8. In combination, a support as defined in claim 1 and a partial denture cast around at least part of said carrier element.

References Cited

UNITED STATES PATENTS

| | | | |
|---|---|---|---|
| 1,299,364 | 4/1919 | Lokey | 32—5 |
| 1,423,288 | 7/1922 | Withers | 32—5 |
| 1,805,264 | 5/1931 | Scheu | 32—5 |
| 2,609,605 | 9/1952 | Dillon | 32—5 |
| 3,057,068 | 9/1962 | Morandi | 32—5 |
| 3,171,202 | 3/1965 | Lasky | 32—5 |

ROBERT PESHOCK, Primary Examiner